United States Patent [19]

David

[11] Patent Number: 4,520,114

[45] Date of Patent: May 28, 1985

[54] PRODUCTION OF METASTABLE TETRAGONAL ZIRCONIA

[75] Inventor: Lawrence D. David, Wappingers Falls, N.Y.

[73] Assignee: Celanese Corporation, New York, N.Y.

[21] Appl. No.: 642,702

[22] Filed: Aug. 22, 1984

Related U.S. Application Data

[63] Continuation of Ser. No. 536,065, Sep. 26, 1983, abandoned.

[51] Int. Cl.$^3$ .............................................. C04B 35/48
[52] U.S. Cl. ................................. 501/12; 423/266; 423/608; 501/103; 501/104; 501/152
[58] Field of Search ................. 501/12, 102, 103, 104, 501/105, 152; 423/608, 266

[56] References Cited

U.S. PATENT DOCUMENTS

| | | | |
|---|---|---|---|
| 4,349,456 | 9/1982 | Sowman | 501/12 |
| 4,358,516 | 11/1982 | Lange | 501/153 |
| 4,360,598 | 11/1982 | Otagiri | 501/103 |
| 4,429,051 | 1/1984 | Davidge et al. | 501/12 |
| 4,465,778 | 8/1984 | Brook et al. | 501/104 |

FOREIGN PATENT DOCUMENTS 57-111278  7/1982  Japan .................................. 501/103

OTHER PUBLICATIONS

Meriani, S., "Thermal Evolution of Ceria–Zirconia Metallorganic Precursors"–Thermochimica Acta, 58 (1982) pp. 253-259.

Suvorova, O. N. et al., "Structure and Properties of Use of Metal $\beta$–Diketonates", Nauka, 1978, pp. 116-119.

Rieth, P. H., et al., "Fabrication and Flexural Strength of Ultrafine-Grained Yttria-Stabilized Zirconia"–J. Am. Cer. Soc.-pp. 717-727.

Primary Examiner—Helen M. McCarthy
Attorney, Agent, or Firm—Depaoli & O'Brien

[57] ABSTRACT

This invention provides a process for producing a fine grain metastable tetragonal zirconia which has an average particle size less than about 1000 angstroms in diameter.

The process involves multistage thermolysis of precursor solids comprising a homogeneous mixture of $\beta$-ketonate compounds of zirconium and a stabilizer metal such as yttrium.

17 Claims, No Drawings

PRODUCTION OF METASTABLE TETRAGONAL ZIRCONIA

This application is a continuation of application Ser. No. 536,065, filed 9/26/83, and now abandoned.

BACKGROUND OF THE INVENTION

Pure zirconium dioxide is characterized by a volume change associated with monoclinic-tetragonal crystal phase transformation at a temperature between about 1000°–1200° C. Such volume change limits the utility of zirconia in refractory applications.

Commercial use of zirconia as a refractory substrate has resulted from the development of stabilized cubic zirconia with additives such as calcium, magnesium, and yttrium oxides. Extensive research has been directed to the study of the functional relationship between the monoclinic/tetragonal/cubic crystal phases of zirconia and the stabilizer additives and the consequential effect on the physicochemical properties.

U.S. Pat. No. 3,525,597 describes the production of a dense polycrystalline fully stabilized cubic zirconia body characterized by a fine grain size and negligible porosity, and which is stable to oxidation at temperatures above 2000° C. and is capable of transmitting visible and infrared radiation. The zirconia body consists of zirconia and about 6 mole percent of yttrium, dysprosium, or ytterbium oxide stabilizer additive. The zirconia body is prepared by hydrolytic decomposition of zirconium and yttrium alkoxides from a mutual solvent to a coprecipitate of mixed oxides, which is further processed by calcining, pressing, and sintering stages. This development of this translucent zirconia (zyttrite) is described further in Journal Of The American Ceramic Society, 50(1), 532(1967) and Ceramurgia International, 8(2), 42(1982). These publications indicate that most metal alkoxides are sensitive to moisture, heat, and light, and they vary in their hydrolytic decomposition rates, which can result in the formation of an inhomogeneous ceramic body.

U.S. Pat. No. 3,634,113 describes a zirconia composition with a cubic crystal structure that is stabilized by an additive which is a mixture of rare earth oxides U.S. Pat. No. 4,035,191 describes a zirconia ceramic composition which is stabilized in the monoclinic and tetragonal crystal phases with 0.1–5% zinc oxide and at least about 0.5% of magnesia or yttria stabilizer additives. The zirconia ceramic composition is mechanically stable under thermal cycling conditions.

U.S. Pat. No. 4,279,655 describes magnesia partially stabilized zirconia ceramic materials. The zirconia is characterized by grains of stabilized cubic zirconia which contain discrete precipitates of tetragonal zirconia and monoclinic zirconia. A ceramic body of the zirconia exhibits high strength and good thermal shock resistance properties.

U.S. Pat. No. 4,358,516 describes $\beta$-$Al_2O_3$ type ceramic electrolytes in which fracture toughness and strength are increased by incorporating metastable grains of tetragonal zirconia in the structure. The metastable zirconia is a solid solution containing a rare earth stabilizer additive. The increased resistance to cracking is attributable to stress-induced martensitic transformation. A crack stress field causes tetragonal zirconia to transform to monoclinic zirconia, which increases the energy required for the crack to propagate and thereby increases the ceramic body resistance to fracture.

U.S. Pat. No. 4,360,598 describes zirconia ceramics stabilized with yttria, and consisting of crystal grains having a mixed phase consisting essentially of tetragonal phase and cubic phase or having a phase consisting essentially of tetragonal phase. A ceramic is produced by molding a fine powder of $Y_2O_3/ZrO_2$ (2/98:7/93) and sintering the molded body at 1000°–1550° C.

A Russian publication (Materials from the 3rd All-Union Seminar, Moscow, "Science", pages 116–119, 1978) describes the production of cubic zirconia by the decomposition of a mixture of zirconium and cerium $\beta$-diketonates. Thermally stable dielectric coatings and films are produced.

Thermochimica Acta, 58, 253(1982) describes the use of gelled metallorganic precursors as starting materials to produce ceria-zirconia tetragonal solid solutions. Drying the gelled precursors provides a fine powder of a quasi-amorphous nature. Upon firing, a ceria-zirconia tetragonal solid solution is obtained which sinters without the separation of individual metal oxide crystallites.

There is continuing interest in the development of zirconia ceramic materials with properties which are uniquely adapted for specialized refractory applications.

Accordingly, it is an object of this invention to provide an improved process for the production of metastable tetragonal zirconia.

It is another object of this invention to provide a fine grain metastable tetragonal zirconia powder which is free of monoclinic and cubic phase crystal structures.

Other objects and advantages of the present invention shall become apparent from the accompanying description and examples.

DESCRIPTION OF THE INVENTION

One or more objects of the present invention are accomplished by the provision of a process for the production of fine grain metastable tetragonal zirconia which comprises (1) preparing a homogeneous solution by dissolving in a solvent medium zirconium $\beta$-diketonate and a metastabilizing quantity of metal $\beta$-diketonate selected from alkaline earth and lanthanide metal $\beta$-diketonates, (2) removing the solvent medium to provide a residual mass of precursor solids, (3) pyrolyzing the precursor solids in an inert atmosphere at a temperature between about 300°–800° C. until the precursor solids have a carbon content between about 1–10 weight percent, based on the weight of precursor solids, and (4) calcining the precursor solids in the presence of molecular oxygen at a temperature between about 300°–800° C. to yield metastable tetragonal zirconia powder having an average particle size less than about 1000 angstroms.

In another embodiment, the present invention contemplates the inclusion of a surfactant in step (1) of the above described process. The surfactant is employed in a quantity between about 0.01–20 weight percent, preferably between about 1–15 weight percent, based on the $\beta$-diketonate content of the step (1) solution.

In a further embodiment, the present invention provides a metastable tetragonal zirconia powder with a crystal structure which is a solid solution of zirconium dioxide and a metastabilizing quantity between about 1–30 mole percent of metal oxide selected from alkaline earth and lanthanide metal oxides, and further characterized by:

(a) a crystallite size up to about 500 angstroms;

(b) an average particle size less than about 1000 angstroms;

(c) particles of equiaxed dimensions; and (d) a substantial absence of monoclinic and cubic phase crystal structures as determined by X-ray diffraction pattern analysis.

The term "metastable" as employed herein refers to zirconia which has a partially stabilized tetragonal phase crystal structure. By the term "partially stabilized" is meant a tetragonal phase crystal structure which is capable of martensitic transformation to the monoclinic phase crystal structure under stress-inducing conditions such as ball-milling at 25° C.

The term "metastabilizing" as employed herein generally refers to a quantity between about 1–30 mole percent of stabilizer metal oxide in solid solution with the zirconium oxide. As described more fully hereinafter, the optimal metastabilizing quantity of metal oxide stabilizer varies depending on the particular metal oxide being employed, as determined experimentally.

In the practice of the invention process, a solution is prepared by dissolving zirconium $\beta$-diketonate and stabilizer metal $\beta$-diketonate in a solvent medium.

Illustrative of suitable $\beta$-diketonate chelating entities are aliphatic compounds corresponding to the formula:

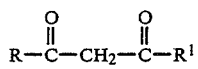

where R and $R^1$ are alkyl or substituted alkyl groups containing between about 1–10 carbon atoms. R and $R^1$ can also be aryl or substituted aryl groups. The preferred $\beta$-diketonate chelating agent is acetylacetone:

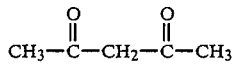

The stabilizer metal $\beta$-diketonate is selected from alkaline earth and lanthanide metal $\beta$-diketonates. Illustrative of alkaline earth metals are Group II metals such as magnesium, calcium, strontium, and the like. Illustrative of lanthanide metals are yttrium, lanthanum, and type 4f rare earth metals of atomic number 58–71, such as cerium, dysprosium, and ytterbium.

The solvent medium employed to prepare the solution of metal $\beta$-diketonates can be selected from any of a wide variety of conventional solvent types which have acceptable solvating properties and which are inert with respect to the solute content. Suitable solvents include alcohols, ketones, ethers, hydrocarbons, halocarbons, and the like, such as ethanol, acetone, tetrahydrofuran, hexane, benzene, and tetrachloroethylene. A water-miscible type of solvent can be diluted with water if desired.

Depending on the particular metal $\beta$-diketonates and the particular solvent medium being utilized, the maximum concentration of the step (1) solution will vary between about 2–30 weight percent of metal $\beta$-diketonates, based on total solution weight.

The dissolution of the metal $\beta$-diketonates in the solvent medium can be facilitated by heating the admixture at reflux temperature for a short period. The addition of a small quantity of concentrated ammonium hydroxide to the admixture aids in clarifying the solution medium, and it appears to enhance the homogeneity of the final metastable tetragonal zirconia product.

There is also particular advantage for purposes of optimizing the properties of the zirconia product to include a surfactant in the step (1) solution medium. The effect of the surfactant is to provide a zirconia product which is a finer, more monodisperse powder with particles of equiaxed dimensions, and which is substantially agglomerate-free as compared to a zirconia product prepared without a surfactant. The average particle size of the surfactant-enhanced zirconia product is less than about 1000 angstroms in diameter, e.g., between about 400–800 angstroms.

Illustrative of suitable surfactants for this purpose are nonionic surface active agents such as sorbitan fatty acid esters, polyoxyethylene sorbitan fatty acid esters, polyoxyethylene sorbitol fatty acid esters, polyoxyethylene fatty acid esters, polyoxyethylene alcohol ethers, glycerine fatty acid esters, propylene glycol fatty acid esters, polyoxyethylene-castor oil derivatives, polyoxyethylene alkyl phenyl ethers, alkyl esters of phosphoric acid, polyoxyethylene esters of phosphoric acid, polyvinyl alcohol, and the like; anionic surface active agents such as salts of alkyl sulfates, salts of polyoxyethylene alkyl ether sulfate, salts of alkyl sulfosuccinates, N-acyl-sarcosine salts, fatty acid salts, homopolymers and copolymers of unsaturated carboxylic acids such as acrylic acid and maleic acid, and the like; and cationic surface active agents such as quaternary ammonium salts and pyridinium salts, and the like.

The removal of the solvent medium from the solution in step (2) of the process is accomplished by any convenient means, such as evaporation or vacuum distillation, to provide a residual mass of precursor solids. The residual mass usually has the appearance and consistency of a firm gel.

An essential aspect of the invention process is the two stage thermolysis treatment of the precursor solids as defined in steps (3) and (4) of the process. In the first stage the precursor solids are pyrolyzed in an inert atmosphere at about 300°–800° C. until the precursor solids have a carbon content between about 1–10 weight percent. The pyrolysis period generally will vary between about 0.2–1 hour. If desired the pyrolysis can be conducted in two or more cycles, with an intervening ball-milling of the glassy char precursor solids. The preferred inert atmosphere is nitrogen, argon, or helium.

It has been found that the presence of carbon in the pyrolyzed precursor solids has a beneficial effect on the final zirconia product properties. The stabilization of the zirconia product in a pure tetragonal phase crystal structure is enhanced if the pyrolyzed precursor solids provided in step (3) contains between about 1–10 weight percent of carbon.

In the second stage of the thermolysis treatment, the pyrolyzed precursor solids are calcined in the presence of molecular oxygen in step (4) of the invention process. The calcination is conducted at about 300°–800° C. for a period between about 0.1–1 hour until the resultant metastable tetragonal zirconia is carbon-free. It is advantageous to calcine the precursor solids in air, and then subsequently in an atmosphere of pure oxygen. The resultant zirconia powder has an average particle size less than about 1000 angstroms in diameter.

An X-ray diffraction analysis of the zirconia product indicates that it is substantially pure phase tetragonal zirconia, without any separate X-ray pattern lines for monoclinic and cubic phases, or any separate lines for the metal oxide stabilizer additive.

The metastability of the tetragonal phase crystal structure is demonstrated by the relative ease with which the zirconia powder transforms to the monoclinic phase crystal structure when the zirconia powder is subjected to stress-inducing energy input by ball-milling at room temperature.

The metastable nature of the tetragonal zirconia is an important property for purposes of end-use applications. In another embodiment, the present invention provides a method of improving the fracture toughness and strength of a ceramic body (e.g., $\beta$-Al$_2$O$_3$) which comprises incorporating therein between about 2-30 percent by volume of a present invention fine grain metastable tetragonal zirconia powder.

For any applications which require extreme high purity (e.g., dielectric applications), the metastable tetragonal zirconia powder is prepared to contain less than about 100 parts per million of metal oxides other than the zirconia and stabilizer metal oxide content.

For refractory or reinforcement applications, the inclusion of up to 3 mole percent HfO$_2$, arising from the naturally-occurring hafnium with zirconium, is advantageous in that it improves the refractory properties of the resultant ceramic powder.

The following Examples are further illustrative of the present invention. The specific ingredients and processing parameters are presented as being typical, and various modifications can be derived in view of the foregoing disclosure within the scope of the invention.

Metal $\beta$-ketonates can be purchased from chemical suppliers, or they can be synthesized in accordance with chemical literature procedures such as that described in Inorganic Synthesis, Volume 2, pages 121-122, ed. by W. C. Fernelius (McGraw-Hill, New York, N.Y., 1946).

EXAMPLE I

This Example illustrates the production of fine grain metastable tetragonal zirconia in accordance with the present invention process.

A reaction flask fitted with a reflux condenser, dropping funnel, and stirrer is charged with a solution of zirconium acetylacetonate [940.76 grams (1.93 moles), Zr(CH$_3$COCHCOCH$_3$)$_4$] and yttrium acetylacetonate [54.05 grams (0.14 mole), Y(CH$_3$COCHCOCH$_3$)$_3$] in three liters of tetrahydrofuran. The solution is heated at reflux for one hour, then the solution is stripped of solvent medium to provide a residual mass of precursor solids.

The precursor solids are loaded in alumina boats and pyrolyzed at 400° C. in a nitrogen atmosphere for a period (e.g., 20-30 minutes) sufficient to lower the carbon content of the precursor solids to 1-10 weight percent. The resultant glassy char is pulverized in a ball-mill for about 5 minutes, and then calcined at 400° C. in air for about 20 minutes. This is followed by 20 minutes of calcining at 400° C. in an atmosphere of pure oxygen. The product yield is 247 grams of an off-white zirconia powder, having an average particle diameter of 950-1000 angstroms as determined by BET surface area and scanning electron microscopy. The crystallite size of the zirconia is about 80-140 angstroms.

BET refers to the Brunauer, Emmett, and Teller procedure as described on pages 16-39 of Introduction To Powder Surface Area, by S. Lowell (Wiley Interscience, New York, N.Y., 1979).

Elemental analysis indicates that the zirconia contains 3.5 mole percent of yttria, and the X-ray crystal structure is essentially pure tetragonal phase. There is no X-ray diffraction pattern evidence of monoclinic or cubic crystal structure phases, or of any separate yttria crystal phase.

The tetragonal zirconia powder transforms to the monoclinic phase when energized by ultrasonic input or by ball-milling. This is indicative that the tetragonal zirconia is partially stabilized, i.e., it is in the metastable phase.

Similar results are obtained when the yttrium acetylacetonate is replaced with a selected molar quantity of one of the following metal acetylacetonates:

| Metal | Mole % AcAc* |
|---|---|
| magnesium | 6 |
| calcium | 7 |
| strontium | 10 |

$$*\frac{\text{moles of M(acac)}_n}{[\text{moles of M(acac)}_n + \text{moles Zr(acac)}_4]} \times 100$$

With each metal $\beta$-diketonate additive, as the molar quantity of additive is increased relative to the zirconium $\beta$-diketonate the resultant zirconia crystal structure changes in stages from metastable tetragonal to fully stabilized tetragonal to tetragonal-cubic to cubic. None of these phases is transformed to monoclinic by ball-milling, except for the metastable tetragonal phase.

EXAMPLE II

The procedure of Example I is followed, except that after the one hour of reflux a 250 milliliter quantity of aqueous ammonium hydroxide (28 weight percent NH$_3$) is added dropwise over a half hour period. This clarifies the solution medium. The solution is refluxed for an additional hour, and then the solvent is stripped to leave a residual gel. The subsequent thermolysis treatment is similar to that in Example I.

The treatment with ammonia yields a metastable tetragonal zirconia with optimal homogeneity.

EXAMPLE III

This Example illustrates an improved embodiment of the present invention process.

The procedure of Example I is repeated, except that 100 milliliters of oleic acid are added to the homogeneous solution of metal $\beta$-ketonates.

After the thermolysis treatment of the precursor solids, a fine grain metastable tetragonal zirconia product is obtained which is free of agglomerates, and which has particles of equiaxed dimensions and an average size between about 400-800 angstroms in diameter.

EXAMPLE IV

A 11.76 gram quantity of ytterbium acetylacetonate (0.025 mole) plus 237.62 grams of zirconium acetylacetonate (0.4875 mole) are charged into the reactor equipment described in Example I, and the acetylacetonates are dissolved in 750 milliliters of acetone. A 25 milliliter quantity of oleic acid is added and the mixture is stirred and refluxed for one hour. The solution is quenched at the end of this period with 65 milliliters of concentrated aqueous ammonia, then refluxed again for one more hour. The solvent is stripped off to yield a residual mass of precursor solids, which is pyrolyzed in the manner of Example I.

The resultant ceramic product is 62.0 grams (95.4% of theoretical yield) of 2.5 mole % $Yb_2O_3$-doped zirconia (partially stabilized in the tetragonal phase) with properties similar to the $Y_2O_3$-stabilized zirconia of Example I.

EXAMPLE V

The synthesis procedure of Example I is repeated with the use of 18.40 grams of dysprosium acetylacetonate (0.04 mole) in place of the yttrium acetylacetonate, and with a decrease in the amount of zirconium acetylacetonate to 233.97 grams (0.48 mole).

The reaction and pyrolysis procedures provide a ceramic product consisting of 63.0 grams (94.6% of theoretical yield) of 4 mole % $Dy_2O_3$-doped zirconia (partially stabilized in the tetragonal phase) with properties similar to the $Y_2O_3$-stabilized zirconia of Example I.

EXAMPLE VI

The synthesis procedure of Example I is repeated with 21.4 grams of cerium acetylacetonate (0.0489 mole) $Ce(CH_3COCHCOCH_3)_3$ in place of the yttrium acetylacetonate, and with a decrease of the zirconium acetylacetonate to 214.2 grams (0.439 mole).

The resultant ceramic product is a 59.3 gram quantity (94.9% of theoretical) of a yellow powder, which is 10 mole % $CeO_2$-doped partially-stabilized tetragonal zirconia of crystallite and particle size similar to the $Y_2O_3$-doped zirconia of Example I.

What is claimed is:

1. A process for the production of fine grain metastable tetragonal zirconia which comprises (1) preparing a homogeneous solution by dissolving in a solvent medium zirconium β-diketonate and a metastabilizing quantity of metal β-diketonate selected from alkaline earth and yttrium metal β-diketonates, (2) removing the solvent medium to provide a residual mass of precursor solids, (3) pyrolyzing the precursor solids in an inert atmosphere at a temperature between about 300°–800° C. until the precursor solids have a carbon content between about 1–10 weight percent, based on the weight of precursor solids, and (4) calcining the precursor solids in the presence of molecular oxygen at a temperature between about 300°–800° C. to yield metastable tetragonal zirconia powder having an average particle size less than about 1000 angstroms.

2. A process in accordance with claim 1 wherein the β-diketonate is acetylacetonate.

3. A process in accordance with claim 1 wherein the solution medium comprises an organic solvent.

4. A process in accordance with claim 1 wherein the solution medium additionally includes a surfactant.

5. A process in accordance with claim 1 wherein the residual mass of precursor solids produced in step (2) is in the form of a gel.

6. A process in accordance with claim 1 wherein the inert atmosphere in step (3) is nitrogen.

7. A process in accordance with claim 1 wherein the calcining in step (4) is conducted in the presence of air.

8. A process in accordance with claim 1 wherein the zirconia powder produced in step (4) is substantially free of monoclinic and cubic phase crystal structures.

9. A process in accordance with claim 1 wherein the zirconia powder produced in step (4) is comprised of particles having equiaxed dimensions.

10. A metastable tetragonal zirconia powder with a crystal structure which is a solid solution of zirconium dioxide and a metastabilizing quantity between about 1–30 mole percent of metal oxide selected from alkaline earth and yttrium metal oxides, and further characterized by:
    (a) a crystallite size up to about 500 angstroms;
    (b) an average particle size less than about 1000 angstroms;
    (c) particles of equiaxed dimensions; and
    (d) is substantially free of monoclinic and cubic phase crystal structures as determined by X-ray diffraction pattern analysis.

11. A metastable tetragonal zirconia powder in accordance with claim 10 wherein the metal oxide is yttrium oxide.

12. A metastable tetragonal zirconia powder in accordance with claim 10 wherein the metal oxide is magnesium oxide.

13. A metastable tetragonal zirconia powder in accordance with claim 10 wherein the metal oxide is calcium oxide.

14. A metastable tetragonal zirconia powder in accordance with claim 10 wherein the metal oxide is strontium oxide.

15. A metastable tetragonal zirconia powder in accordance with claim 10 wherein the content of metal oxide impurities is less than about 100 parts per million.

16. A method of improving the fracture toughness and strength of a ceramic substrate which comprises incorporating therein between about 2–30 percent by volume of fine grain metastable tetragonal zirconia as defined in claim 10.

17. A ceramic body produced in accordance with the method of claim 16.

* * * * *